(12) United States Patent
Bernardin

(10) Patent No.: US 12,326,344 B2
(45) Date of Patent: Jun. 10, 2025

(54) METHOD FOR LOCATING ROAD OBJECTS

(71) Applicant: Continental Automotive Technologies GmbH, Hannover (DE)

(72) Inventor: Matthieu Bernardin, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 186 days.

(21) Appl. No.: 18/031,718

(22) PCT Filed: Oct. 14, 2021

(86) PCT No.: PCT/EP2021/078511
§ 371 (c)(1),
(2) Date: Apr. 13, 2023

(87) PCT Pub. No.: WO2022/079196
PCT Pub. Date: Apr. 21, 2022

(65) Prior Publication Data
US 2023/0408290 A1    Dec. 21, 2023

(30) Foreign Application Priority Data
Oct. 14, 2020   (FR) ...................................... 2010529

(51) Int. Cl.
*G01C 21/00*    (2006.01)
(52) U.S. Cl.
CPC ..... *G01C 21/3822* (2020.08); *G01C 21/3841* (2020.08); *G01C 21/3848* (2020.08)
(58) Field of Classification Search
CPC ............ G01C 21/3822; G01C 21/3841; G01C 21/3848; G01C 21/30
See application file for complete search history.

(56) References Cited

U.S. PATENT DOCUMENTS 10,282,623 B1\*   5/2019  Ziyaee ................. G06V 10/764
2015/0181551 A1\*  6/2015  Sonnenburg ............ G08G 1/20
                                                          455/456.1

(Continued)

FOREIGN PATENT DOCUMENTS

DE    102013009856 A1 \* 12/2014   ......... G01C 21/3602
EP    3333803 A1    6/2018
EP    3637371 A1    4/2020

OTHER PUBLICATIONS

Machine Translation of DE102013009856A1 (Year: 2014).\*

(Continued)

*Primary Examiner* — Sahar Motazedi
(74) *Attorney, Agent, or Firm* — Buchanan Ingersoll & Rooney PC

(57) ABSTRACT

A method and device for locating road objects based on a plurality of routes transmitted by at least one vehicle driven on a road network. A route transmitted by a vehicle including a plurality of successive vehicle locations acquired during a driving session. At least one road object detected during the driving session by a sensor of the vehicle, the road object associated with a location of the vehicle at the time of detection. The method selects routes having at least one calibration road object in a list of calibration road objects. The list is initialized with at least one road object with a known location. For each selected route, at least one readjustment parameter is computed. The computed readjustment parameter applied to the objects in the route to obtain a calibrated route. The list of calibration objects being updated with the locations of road objects in the readjusted route.

11 Claims, 5 Drawing Sheets

(56) References Cited

U.S. PATENT DOCUMENTS

| | | | |
|---|---|---|---|
| 2018/0246907 A1* | 8/2018 | Thiel | G06F 16/29 |
| 2019/0003847 A1 | 1/2019 | Song et al. | |
| 2020/0166364 A1* | 5/2020 | Fujita | G01C 21/3881 |
| 2020/0300637 A1 | 9/2020 | Chiu et al. | |
| 2021/0165108 A1* | 6/2021 | Heinonen | G01S 19/40 |

OTHER PUBLICATIONS

International Search Report and Written Opinion for International Application No. PCT/EP2021/078511, mailed Jan. 24, 2022, 9 pages.
International Search Report and Written Opinion for International Application No. PCT/EP2021/078511, mailed Jan. 24, 2022, 15 pages (French).
French Search Report for French Application No. 2010529, dated Jun. 11, 2021 with translation, 12 pages.

* cited by examiner

METHOD FOR LOCATING ROAD OBJECTS

CROSS REFERENCE TO RELATED APPLICATIONS

This application is the U.S. National Phase Application of PCT International Application No. PCT/EP2021/078511, filed Oct. 14, 2021, which claims priority to French Patent Application No. 2010529, filed Oct. 14, 2020, the contents of such applications being incorporated by reference herein.

FIELD OF THE INVENTION

The invention relates to the field of high-resolution mapping of road infrastructure, and in particular pertains to a method and device allowing the location of road objects identified by vehicles while they are being driven on a road network to be accurately determined.

BACKGROUND OF THE INVENTION

To perform high-definition mapping, it is common in the industry to equip vehicles with various sensors suitable for collecting data while these vehicles are being driven around.

Due to the inaccuracy of the sensors used, and/or the high speed of movement of the vehicles, an offset is often observed between the location of an infrastructure element as determined by a vehicle and its actual position. Thus, before these data may be used, it is necessary to process them with a view to correcting the observed offsets. To do this, reference points the absolute location of which is known are conventionally used: these reference points, when they are detected by a vehicle, make it possible to estimate the error introduced by the sensors and to determine a correction parameter allowing the collected data to be readjusted.

However, this technique has limitations. In particular, only the data transmitted by vehicles having crossed and detected a reference point may be corrected. However, since the manual creation of reference points is costly, they cover a very small proportion of any given road network. Furthermore, reference points may have a limited lifespan: for example, a sign the position of which is known may be moved or removed.

There is therefore a need for a method allowing data transmitted by a vehicle during a driving session to be readjusted even when no reference point is detected by the vehicle during the session.

SUMMARY OF THE INVENTION

To this end, a method is provided for locating road objects on the basis of a plurality of routes transmitted by at least one vehicle being driven on a road network, a route transmitted by a vehicle comprising:
  a plurality of successive vehicle locations acquired during a driving session,
  at least one particular road object detected during the driving session by a sensor of the vehicle, said object being associated with a location of the vehicle at the time of its detection,
the method comprising the following steps
  initializing a list of calibration road objects, whereby a particular road object is associated with a location, with at least one road object the actual location of which is known,
  selecting routes comprising at least one road object referenced in the list of calibration road objects, and
  for each selected route,
    computing at least one readjustment parameter representative of a discrepancy between a location associated with an object in the route, and a location associated with said object in the calibration list,
    applying the computed readjustment parameter to the objects comprised in the route to obtain a calibrated route, and
    updating the list of calibration objects with the locations of road objects comprised in the readjusted route,
  the steps of selecting, computing, applying and updating being repeated provided that at least one computed readjustment parameter is above a particular threshold.

Thus, when a reference road object, i.e. a road object the actual position of which is known, is detected by a vehicle while it is being driven on a road network, the difference between the actual location of the road object and the location of this object as determined by the vehicle is used to correct the position of other road objects detected by this vehicle while it is driving around. Road objects the location of which is thus corrected may then be added to a list of calibration objects used as a reference to adjust the position of road objects detected by another vehicle having detected one of these road objects.

In this way, it is possible to improve the accuracy of the location of road objects detected by vehicles that have not crossed reference road objects, i.e. road objects the actual position of which is known.

By road object, what is meant is an element of road infrastructure such as a sign, a traffic light, a roundabout, a bridge, a tunnel or even an identifiable element in the environment, such as a building, an item of street furniture or even a tree.

Within the context of an aspect of the invention, a reference road object is a road object the actual location of which is known. This location may be determined manually by an operator, using particularly accurate locating devices.

By calibration road object, what is meant is a road object for which a more reliable location is available, either because the actual location of the object is known, or because the location of the object has been corrected by applying a readjustment parameter via the steps of selecting, computing, applying and updating of the locating method. Calibration road objects allow a discrepancy between the position of an object as detected by a vehicle and a more reliable position of this object to be assessed.

According to an aspect of the invention, a readjusted route is a route in which the location of the detected objects has been corrected by applying a readjustment parameter, or in which the sampling times of the successive positions of the vehicle have been modified by adding or subtracting a correction value. For example, the processing time of an image acquired by an on-board camera with a view to detecting a road object or the latency of a sensor of a vehicle may introduce an offset between the position of the vehicle as given by a GNSS receiver and actual detection of the object: when the object is considered detected, the vehicle may have already passed the object, in particular if it is moving at high speed. By estimating this offset and applying it to the data of the route, a readjusted route in which the locations correspond better to the actual location of the objects is obtained.

According to one particular embodiment, the step of computing a readjustment parameter comprises:

computing a first discrepancy between a location associated with a first object in the route, and a location associated with said first object in the calibration list, and computing at least a second discrepancy between a location associated with a second object in the route, and a location associated with said second object in the calibration list.

Thus, when a vehicle crosses at least two road objects present in the calibration list, i.e. two objects for which a more reliable location is available, either because the actual location of the object is known, or because the location of the object has been corrected by applying a readjustment parameter via the steps of selecting, computing, applying and updating of the locating method, provision is made to compute a readjustment parameter that takes into account the location discrepancies computed for these two objects. For example, the readjustment parameter may be computed on the basis of the smallest computed discrepancy or of an average of the discrepancies.

According to one particular embodiment, the first and second computed discrepancies are weighted by confidence indices associated with the locations of the first and second calibration objects, respectively, a confidence index being inversely proportional to the number of iterations of the steps of selecting, computing, applying and updating that preceded the update of the corresponding calibration object in the list.

Provision is thus made to associate a confidence index with calibration road objects when they are added to the calibration list. For example, a road object the actual position of which is known is associated with a high confidence index, whereas a confidence index associated with a calibration object the corrected position of which was obtained after one or more iterations of the steps of the method is lower. Specifically, a calibration object obtained by readjusting a route is less reliable than a calibration object obtained on the basis of an actual position of the object. Thus, the reliability of the location decreases with the number of iterations of the steps of the method.

According to one particular embodiment, the step of computing a readjustment parameter comprises computing an average of a first discrepancy between a location associated with a first object in the route and a location associated with said first object in the calibration list, and of a second discrepancy between a location associated with a second object in the route, and a location associated with said second object in the calibration list.

In this way, when a vehicle crosses a plurality of road objects for which a more reliable location is available, the route is readjusted based on the observed average discrepancy. Such a measure allows road-object locations to be obtained with increased accuracy, by taking into account any variations in the offset during the session.

In one preferred embodiment, the step of computing a readjustment parameter comprises computing an average of a first discrepancy between a location associated with a first object in the route and a location associated with said first object in the calibration list, and of a second discrepancy between a location associated with a second object in the route and a location associated with said second object in the calibration list, the computed average being an average weighted by the confidence indices associated with the first and second calibration objects, respectively.

In this way, the discrepancies observed with the most reliable calibration road objects contribute more to the readjustment of a route. The accuracy of road-object locations is improved.

According to one particular embodiment, the method is such that, when a route comprises at least first and second calibration objects for which first and second readjustment parameters are respectively computed, a third readjustment parameter is estimated for a road object located temporally in the route between the first and second calibration objects, the estimation being carried out via a regression based on the readjustment parameters computed for the first and second calibration objects and on the respective time of detection of the first, second and third objects.

Such a measure makes it possible not to apply a uniform readjustment to the route, but on the contrary to fine-tune the readjustment to various road objects detected by a vehicle, in particular when the offset between the position of the objects as detected by the vehicle and their actual positions is variable over time, for example when the offset depends on the speed of movement of the vehicle.

In one particular embodiment, the regression is weighted by confidence indices associated with the first and second calibration objects.

In this way, the discrepancy determined between the location of a road object as determined by a vehicle and its actual position is taken into account more in the estimation of intermediate discrepancies when the object is associated with a high confidence index. Estimation of the location of intermediate objects is thus improved.

According to another aspect, the invention relates to a device for locating road objects on the basis of a plurality of routes transmitted by at least one vehicle being driven on a road network, a route transmitted by a vehicle comprising:

a plurality of successive vehicle locations acquired during a driving session, at least one particular road object detected during the driving session by a sensor of the vehicle, said object being associated with a location of the vehicle at the time of its detection, the device comprising a processor, and a memory in which are stored computer program instructions suitable for configuring the processor to implement the following steps:

initializing a list of calibration road objects, whereby a particular road object is associated with a location, with at least one road object the actual location of which is known, selecting routes comprising at least one road object referenced in the list of calibration road objects, and for each selected route, computing at least one readjustment parameter representative of a discrepancy between a location associated with an object in the route, and a location associated with said object in the calibration list, applying the computed readjustment parameter to the objects comprised in the route to obtain a calibrated route, and updating the list of calibration objects with the locations of road objects comprised in the calibrated route, the steps of selecting, computing, applying and updating being repeated provided that at least one computed readjustment parameter is above a particular threshold.

An aspect of the invention also relates to a server comprising a locating device such as described above.

Lastly, an aspect of the invention relates to a processor-readable data medium on which is stored a computer program comprising instructions for executing the steps of a method for locating road objects such as described above.

The data medium may be a non-volatile data medium such as a hard disk, a flash memory or an optical disk, for example.

The data medium may be any entity or device which is capable of storing instructions. For example, the medium may comprise a storage means, such as a ROM, RAM, PROM, EPROM, a CD ROM or even a magnetic recording means, a hard disk for example.

Furthermore, the data medium may be a transmissible medium such as an electrical or optical signal, which is able to be routed via an electrical or optical cable, by radio or by other means.

Alternatively, the data medium may be an integrated circuit, in which the program is incorporated, the circuit being suitable for executing or for being used in the execution of the method in question.

The various aforementioned embodiments and features may be added, independently or in combination with one another, to the steps of the method for locating road objects.

The devices, servers and data media have at least advantages analogous to those conferred by the method to which they relate.

BRIEF DESCRIPTION OF THE DRAWINGS

Other features, details and advantages of aspects of the invention will become apparent on reading the detailed description given below, and on analyzing the appended drawings, in which.

DETAILED DESCRIPTION OF THE PREFERRED EMBODIMENTS

Figure 1A:
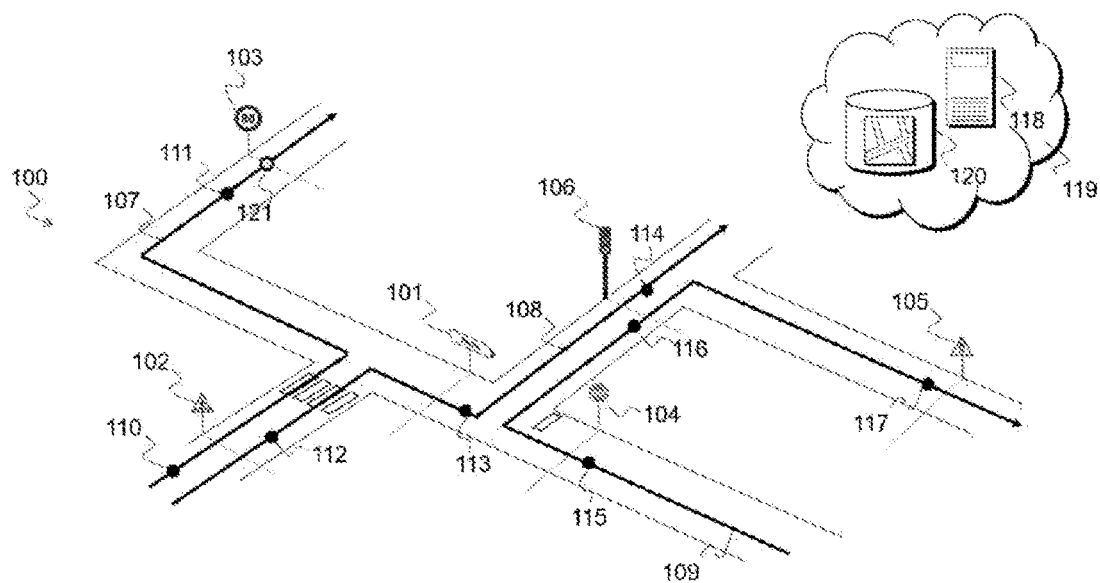
FIG. 1A shows a road network comprising a plurality of road objects, on which road network trips made by vehicles have been indicated.
Figure 1B:
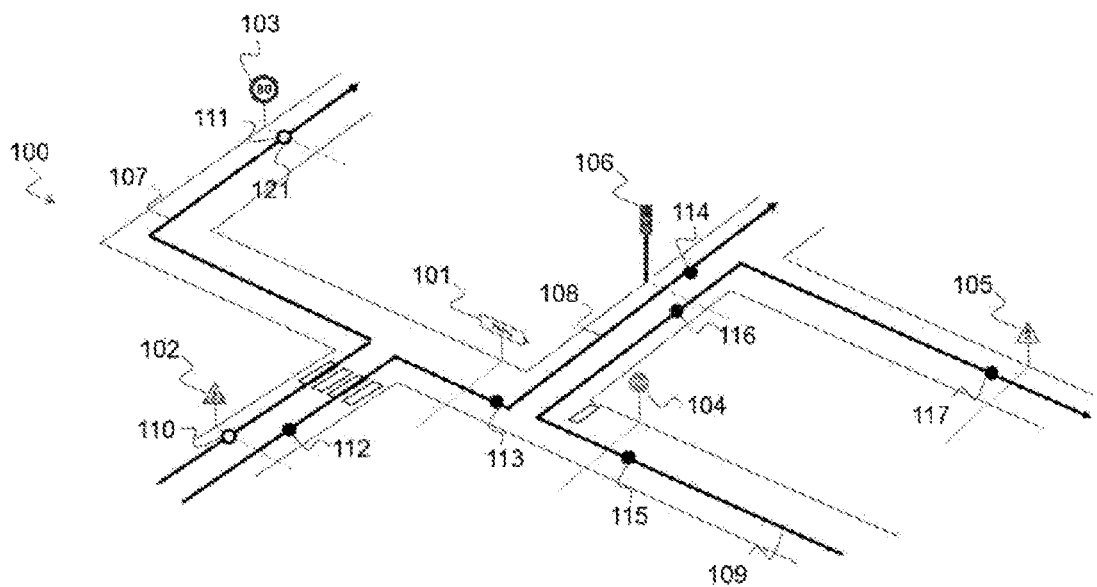
FIG. 1B shows a road network after calibration of a first route.
Figure 1C:
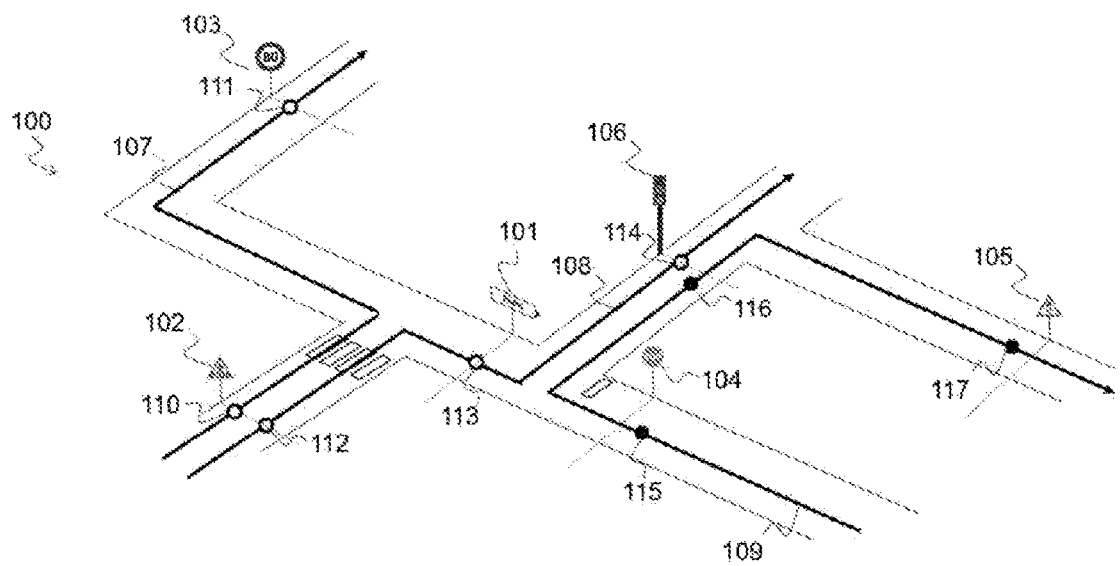
FIG. 1C shows a road network after calibration of a second route.
Figure 1D:
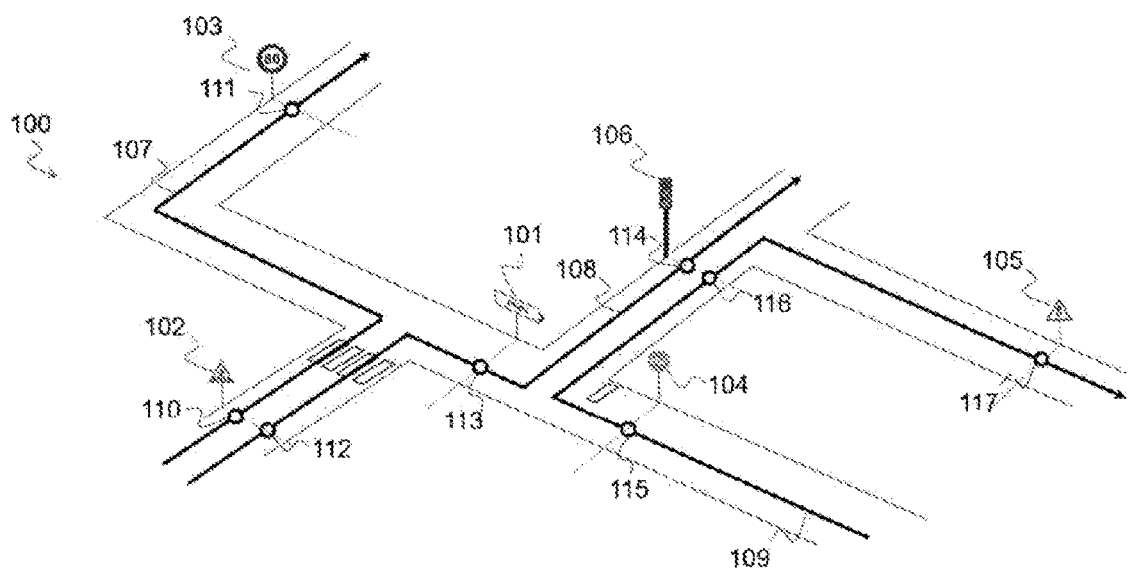
FIG. 1D shows a road network after calibration of a third route.

FIGS. 1A-1D schematically show a road network 100 comprising a plurality of road objects, such as traffic signs 101 to 105 and a traffic light 106.

Also shown are trips 107, 108 and 109 made by vehicles during separate sessions of driving on the road network 100.

The trips 107, 108 and 109 are obtained by collecting vehicles equipped with a locating device, for example a GNSS receiver (GNSS standing for Global Navigation Satellite System). A collecting vehicle thus regularly interrogates the GNSS receiver in order to obtain a route comprising its successive locations, each associated with a time stamp. A collecting vehicle is further equipped with one or more sensors allowing it to detect particular objects in its environment while it is being driven, such as a camera, a lidar and/or a radar. By analyzing images captured by a camera, a collecting vehicle may thus detect road objects such as elements of road infrastructure (bridges, tunnels, etc.) or traffic signs. To do this, a collecting vehicle comprises a processing unit, such as an ECU (Electronic Control Unit) implementing a suitable recognition algorithm. This algorithm in particular makes it possible to detect the presence of a road object and to define its type. Thus, during a trip, a collecting vehicle generates a route comprising a succession of geographical locations that it occupies, each location being associated with the time at which it is obtained and, where appropriate, with a road object detected at this location. The route is transmitted to a server 118 by means of a communication network 119 in order, for example, to produce a high-definition map of the road network, on which map the locations of the road objects detected by the various collecting vehicles are precisely indicated.

The locations at which the road objects 101 to 106 were detected by the collecting vehicles while they were being driven on the network 100 have been represented by black dots on the trips. For example, on trip 107, sign 102 was detected at location 110 and sign 103 was detected at location 111. For the sake of readability, the moment when these signs should theoretically have been detected on the trip has been indicated in the figure by a dotted line perpendicular to the roadway and originating at the corresponding sign. It can be seen that, in these examples, the time at which an object is detected does not correspond to the time when the vehicle is closest to this object, this resulting in the signs 102 and 103 being incorrectly positioned in route 107. Such a positioning error is for example due to the fact that the various sensors of the vehicle are not synchronized and all have their own clock and their own operating frequency (the frequency at which a location is obtained via a GNSS receiver is lower than the frequency of capture of images by a camera, for example). Thus, there may be an offset between the time of capture of an image by a camera and the time at which a GNSS location is obtained. This offset causes an error that increases as the speed of movement of the vehicle increases.

Returning to FIGS. 1A-1D, it can be seen that routes 108 and 109 also comprise offsets: in route 108, objects 102, 101 and 106 were located at locations 112, 113 and 114, respectively, and therefore with a delay with respect to when they should theoretically have been located, whereas, in route 109, objects 104, 106 and 105 were located at locations 115, 116 and 117, respectively, i.e. before their actual location.

It will be noted that, in the present description, what is meant by the location of a road object as determined by a vehicle is the location of the vehicle when the latter is closest the road object.

The server 118 of FIG. 1A is for example a computer server connected to a communication network 119 and suitable for processing the data transmitted by the collecting vehicles via the communication network 119. To do this, the server 118 comprises a processing unit, for example one or more processors, and a memory. The server is further connected to a database 120 in which are stored locations of so-called reference road objects the actual location of which is known. A record of the database 120 for example comprises a signature of a particular reference road object and its geographic coordinates.

The signature of a particular road object is for example computed on the basis of an image or of features extracted from a signal delivered by a sensor, for example a feature obtained by analyzing a camera image, a radar echo or a lidar echo. The signature may further comprise a geographical area in which the object is located, a geohash for example. Generally, such a signature may be computed by a vehicle which is being driven, on the basis of an image captured by a camera, and is computed so that, for a given road object, the signatures computed by different vehicles are identical.

Among the road objects in FIGS. 1A-1D, the sign 103 is a reference road object the actual location of which is known and stored in the database 120.

Figure 2:
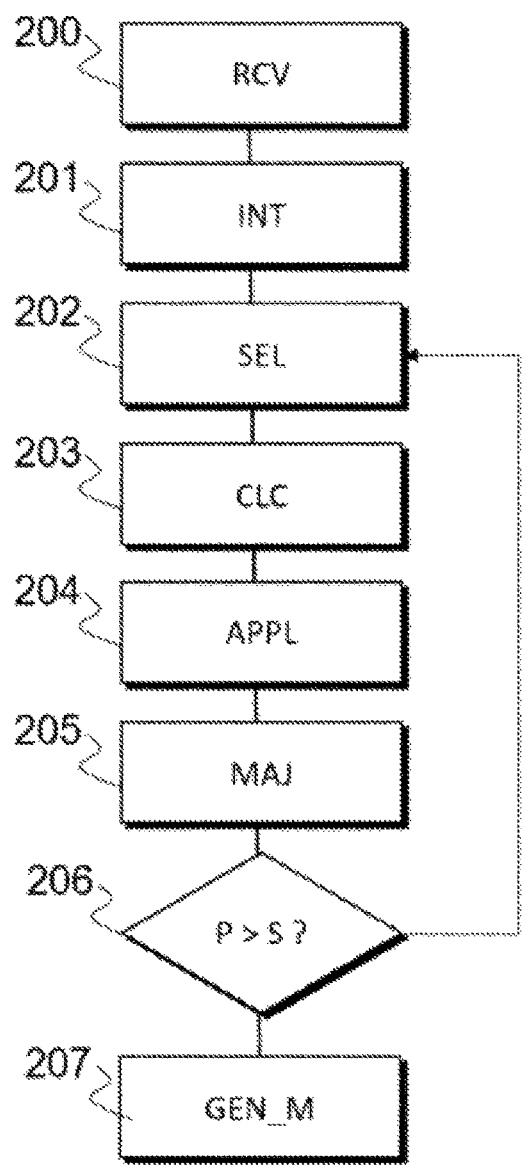
FIG. 2 is a flowchart that shows the main steps of a method for locating road objects according to one particular embodiment.

The steps of the locating method according to one particular embodiment will now be described with reference to FIG. 2.

In a first step 200, the server 118 receives a plurality of routes transmitted by at least one collecting vehicle. The routes are for example transmitted in the form of a file in JSON or XML format, or in any other suitable format, via a 2G, 3G, 4G, 5G, Wi-Fi or WiMAX cellular access network to which the vehicle is connected or via a removable storage medium.

The routes received by the server 118 are stored in a database, for example the database 120, or in a file system, pending their processing by the server 118. In the example of FIG. 1A, the routes 107, 108 and 109 are received by the server and stored in a database, for example the database 120.

In a step 201, a list of calibration road objects is initialized. This list is for example stored in the database 120 and allows the server 118 to obtain a more reliable location of a particular road object on the basis of its signature. To do this, the server for example transmits, to the database 120, an SQL query configured to select the records corresponding to a particular road-object signature, in order to obtain, in return, if the signature corresponds to a record, a location of said road object.

The list of calibration objects is thus initialized with reference road objects the geographical location of which is known with precision. Thus, taking the example of FIG. 1A, the calibration database 120 is initialized with the only road object the actual location of which is known, i.e. the sign 103.

In a step 202, the server 118 selects, from among the routes received, all the routes which comprise a signature of at least one road object comprised in the calibration database. To do this, the server examines the signatures of detected road objects in each of the received routes, and makes a request to the database 120 for each signature in order to determine whether the vehicle that transmitted the route has detected, during the driving session, a road object present in the list of calibration objects. As a variant, the routes are selected by the server depending on a geographical criterion, so that only routes comprised in a particular geographical area are selected, the request then comprising a geographical-area identifier such as a geohash, on the basis of which routes are selected.

Thus, with reference to FIG. 1A, the server 118 makes requests to the database 120 with the signatures of the road objects detected in routes 107, 108 and 109. In the present case, for route 107, the server performs a search with the signature of object 102 detected at position 110 and with the signature of object 103 detected at position 111. Since the database was initialized with reference object 103, only the signature of object 103 detected at position 111 elicits a response. Route 107 is thus selected. Since the other routes 108 and 109 do not comprise detected road objects the signature of which appears in the database 120, they are not selected at this stage.

The server 118 computes, in step 203, at least one readjustment parameter representative of a discrepancy between a location associated with object 103 in the selected route 107, i.e. the position 111, and the location associated with object 103 in the calibration database 120. To do this, the server 118 determines a location 121 corresponding to the position of the vehicle when it was closest to the actual position of the sign 103, which is obtained from the database 120, and computes a value of a readjustment parameter $P_{r1}$ that is representative of a discrepancy between the position 111 at which the vehicle located object 103 and the position 121 where the vehicle should theoretically have located sign 103. This discrepancy is for example a distance or a time interval separating the positions 121 and 111.

The readjustment parameter thus computed is then applied, in a calibrating step 204, to the other objects detected in the route 107. To do this, the server 118 applies the parameter $P_{r1}$ to position 110 to correct the positioning errors.

Figure 3:
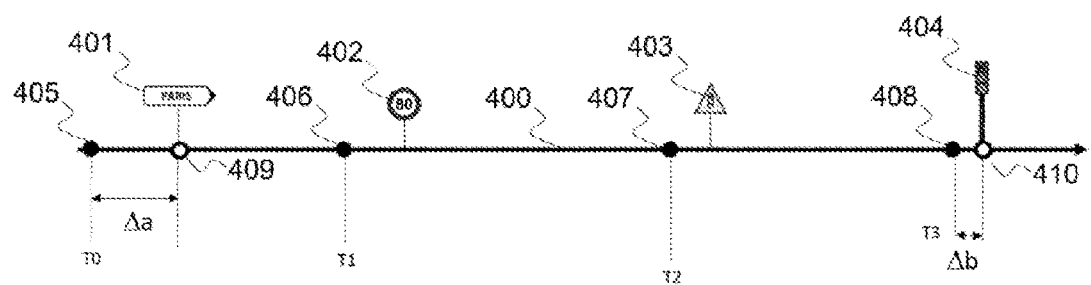
FIG. 3 shows a route comprising two detected calibration objects.

Since the position of the road object 102 thus corrected is now more reliable, the object is added to the calibration database 120 in a step 205. FIG. 3 shows the road network of FIGS. 1A-1D on which the route 107 has been calibrated: the positions of detection 110 and 111 of the respective road objects 102 and 103 are updated and have been represented by white dots indicating that they are now calibration objects.

When at least one new calibration object is added to the calibration list, or indeed when the readjustment parameter computed for one of the routes in step 203 is greater than a determined threshold, steps 202 to 205 are repeated. For example, when at least one of the selected routes is calibrated with a readjustment parameter implying that objects must be repositioned by at least 30 meters or by at least one second, steps 202 to 205 are repeated. In one particular embodiment, a maximum number of iterations is configured so as to guarantee the algorithm will stop. The maximum permitted number of iterations may be predetermined or be proportional to the number of routes selected in step 202. Thus, the method comprises a step 206 in which a stop condition is tested, the stop condition possibly being stabilization of a readjustment parameter from one iteration to the next, or even achievement of a maximum number of iterations.

In the present case, since a new object has been added to the calibration list, the server 118 repeats steps 202 to 205, using the new calibration objects 102 and 106 added to the database 120 to select routes.

Routes 107 and 108 are selected in step 202 in this second iteration because they comprise signatures of road objects 102 and 103 referenced in the calibration database. In step 203, the server computes a readjustment parameter $P_{r2}$ for route 108 on the basis of the discrepancy between a location 112 at which the object 102 is positioned in the route, and the associated corrected location 110 of the same object 102 as added to the calibration list in the previous iteration. The readjustment parameter $P_{r2}$ thus computed allows the positioning of objects 101 and 106 detected at positions 113 and 114 in the route 108 to be corrected, in order to obtain a calibrated route in step 204. Objects 101 and 106 the location of which is corrected by applying the readjustment parameter $P_{r2}$ are then added to the list of calibration road objects.

Since two new objects have been added to the calibration list, the server once again executes steps 202 to 205 of the method. In this third iteration, route 109 is selected because it comprises a reference to object 106 now present in the database 120 of calibration road objects. A readjustment parameter $P_{r3}$ is computed on the basis of a discrepancy between the position 11 of object 106 detected in route 109 and the corrected position of this object added to the calibration database 120 and applied to route 109 to readjust objects 104 and 105. Objects 104 and 105 are in turn added to the calibration database, in association with their position corrected by applying the readjustment parameter $P_{R3}$.

In this way, the location of the road objects detected by vehicles while they are being driven around is made more reliable, even when the vehicle does not cross any reference objects. FIG. 3 shows the road network 100, on which have been shown the routes 107, 108 and 109 readjusted via implementation of the three iterations described above. The location of the detected road objects is improved. These objects may be used to generate a high-resolution map of the road network.

FIG. 3 shows a route 400 transmitted by a vehicle during a driving session. In this driving session, the vehicle detected road objects 401, 402, 403 and 404 at times 405, 406, 407 and 408, respectively. The road objects 401 and 404 are calibration road objects which have been added to a list of calibration objects, either because their actual location is known, or because they have been readjusted on the basis of data transmitted by other vehicles according to the steps described above. The location data associated with road object 401 in the calibration list indicate that sign 401 should have been detected at time 409, and the location data associated with road object 404 in the calibration list indicate that object 404 should have been detected at time 410. Thus, two objects 401 and 404 are available to calibrate the route 400.

According to one particular embodiment, to compute a readjustment parameter in step 203, the server 118 computes a first discrepancy Δa between the position of the object 401 indicated in route 400, and the position of the same object 401 such as indicated in the calibration list.

The server 118 also computes a second discrepancy Δb between the position of the object 404 as indicated in route 400 and the location of the same object 404 in the calibration list.

According to one particular embodiment, the readjustment parameter is an average discrepancy computed by averaging the first discrepancy Δa and the second discrepancy Δb. This average discrepancy is then applied to the route 400 to correct the respective positions 406 and 407 of the road objects 402 and 403 to obtain a calibrated route in step 204.

According to one particular embodiment, a road object of the calibration list is associated with a confidence index. A maximum confidence value is associated with a reference road object, i.e. a calibration road object the actual location of which is known and available in the calibration list. A road object added to the calibration list following readjustment is associated with a lower confidence index. For example, with reference to FIG. 1A, road object 103 is associated with a maximum confidence index in the calibration list, for example an index of value 0. The calibration object 102, added to the calibration list following readjustment of the route 107, is associated with a lower confidence index, for example an index of value 1. The sign 101 was added to the calibration list in a second iteration in which route 108 was calibrated on the basis of route 107. Thus, a confidence index of value 2 may be associated with this road object in the calibration database. Thus, the confidence associated with a calibration road object is inversely proportional to the number of iterations of the steps of the method that preceded addition of the object to the calibration list.

In this example, it has been chosen to make the value of the confidence index vary inversely proportionally to the location accuracy of the associated object, i.e. the value of an index increases as accuracy decreases. However, it is entirely conceivable, without modifying an aspect of the invention, to make the value of the index decrease in proportion to the number of iterations.

In one particular embodiment, the confidence index associated with the road object 401 and the confidence index associated with the road object 404 of FIG. 3 are used to compute a readjustment parameter, the readjustment parameter corresponding to an average of the first discrepancy Δa and of the second discrepancy Δb that is weighted by the respective confidence indices of the objects 401 and 404.

According to another particular embodiment, when a plurality of calibration objects are available in the calibration list to calibrate a particular route, only the calibration road object associated with the highest confidence index is taken into account to compute the readjustment parameter.

According to one particular embodiment, when a route 400 comprises at least a first calibration object 401 and a second calibration object 404 for which a first discrepancy Δa and a second discrepancy Δb have been computed, respectively, a distinct readjustment parameter is estimated for each of the road objects 402 and 403 located temporally in the route between the first object 401 and the second calibration object 404, the estimation being carried out via a regression based on the discrepancies Δa and Δb computed for the first calibration object 401 and second calibration object 404, respectively, and on the respective time of detection of the first, second and third objects. Thus, for example, if the calibration objects 401 and 404 were detected at times T0 and T3, respectively, then a readjustment parameter estimated for the object 402 detected at time T1 is given by an affine function.

Thus, a readjustment parameter at the time T1 of detection of object 402 is estimated via:

$$f(T1) = a \cdot T1 + b$$

and for object 403 via:

$$f(T2) = a \cdot T2 + b$$

with:

$$a = \frac{\Delta b - \Delta a}{T3 - T0}$$

and:

$$b = \frac{T3 \cdot \Delta a - T0 \cdot \Delta b}{T3 - T0}$$

Figure 4A:
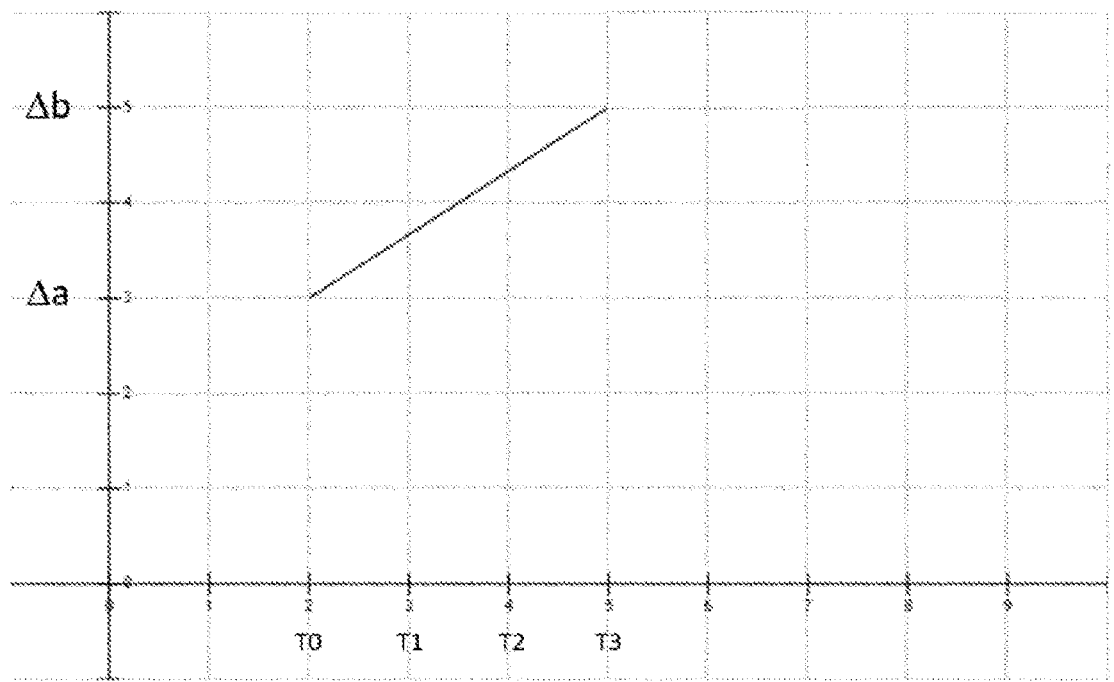
FIG. 4A is a graphical representation of one particular linear variation in a readjustment parameter over time.

FIG. 4A is a graphical representation of the variation in the discrepancy (y axis) between a position of an object as determined by the vehicle and its actual position over time (x axis). Thus, knowing the discrepancy between the actual location of the calibration object 401 and its position as detected by the vehicle at time T0 and the discrepancy between the actual location of the object 404 and its position as detected by the vehicle at the time T3 of detection by the vehicle, a particular correction parameter to be applied on detection of objects 402 and 403 by the vehicle is determined via a linear function.

According to one particular embodiment, the discrepancies Δa and Δb are weighted by confidence indices associated with road objects 401 and 404, respectively, to estimate the readjustment parameters to be applied to objects 402 and 403 of the route.

$$f(Tn)=a \cdot (d \cdot Tn+e)^b + c$$

with:
- a: the difference between the discrepancy determined at time T0 and the discrepancy determined at time T3,
- b: the ratio between the confidence index associated with object 401 and the confidence index associated with object 404,
- c: the discrepancy observed between the actual position of object 401 and the position detected by the vehicle at time T0, and
- d and e: factors that bring the values [T0-T3] into the interval [0-1].

Figure 4B:
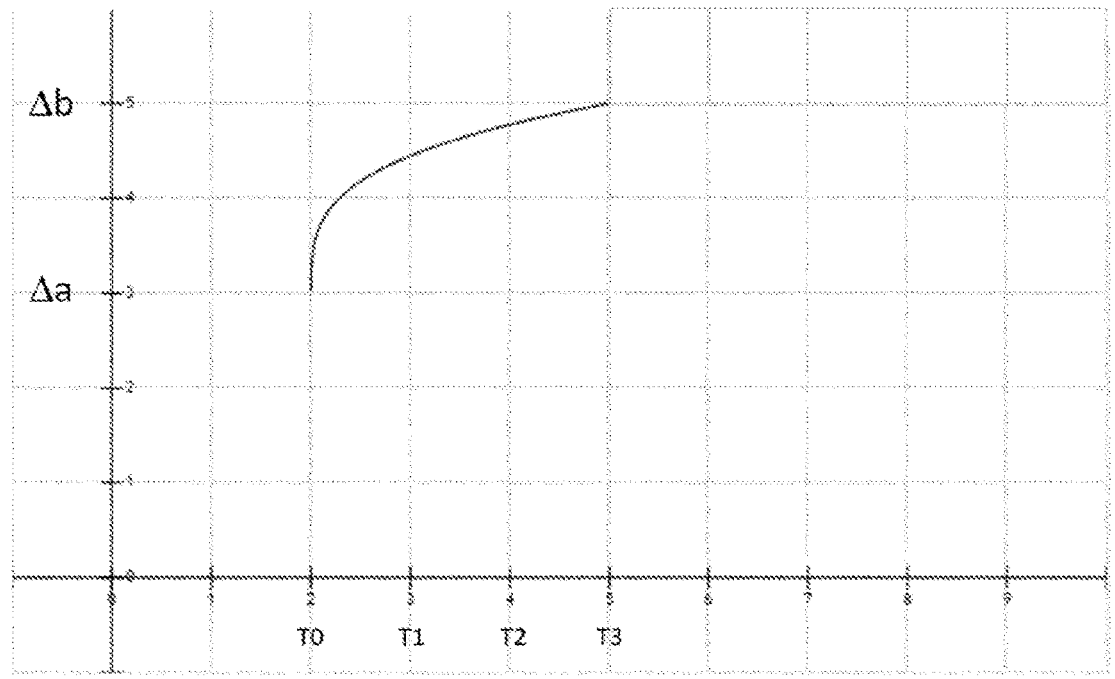
FIG. 4B is a graphical representation of one particular non-linear variation in a readjustment parameter over time.
Figure 4C:
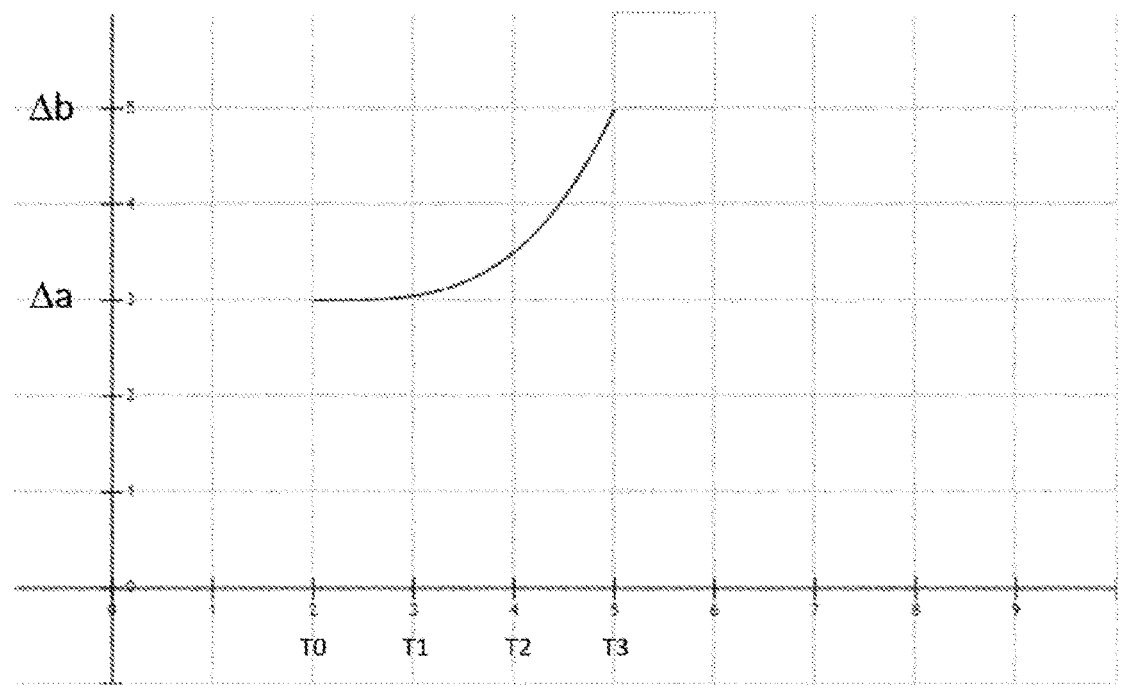
FIG. 4C is a graphical representation of another particular linear variation in a readjustment parameter over time.

FIG. 4B is a graphical representation of the variation in the discrepancy (y axis) between a position of an object as determined by the vehicle and its actual position over time (x axis). In the example of FIG. 4B, the calibration road object 404 is associated with a confidence index higher than the confidence index associated with the calibration road object 401. Thus, the discrepancy does not evolve linearly with time. FIG. 4C is another graphical representation of the variation in the discrepancy (y axis) between a position of an object as determined by the vehicle and its actual position over time (x axis), in which representation the calibration road object detected at time T0 is associated with a confidence index higher than the confidence index associated with the calibration road object detected at time T3.

When the stop condition is met in step 206, the object locations corrected via route readjustment in one or more iterations of steps 202 to 205 are used to update a geospatial database by way of high-definition map, in a step 207.

In one preferred embodiment, steps 200 to 207 of the method described above are implemented via computer program instructions stored in a memory and suitable for configuring a processor of a device so as to implement the method when the instructions are executed by the processor. For example, the instructions are loaded into the memory of the server 120 on its initialization, and executed by the processor of the server 120.

The invention claimed is:

1. A method for locating road objects based on a plurality of routes transmitted by at least one vehicle being driven on a road network, the method comprising the following steps:
   - initializing a list of calibration road objects with at least one calibration object associated with an actual location that is known, wherein each calibration object in the list of calibration road objects is associated with a respective actual location that is known;
   - selecting routes, among the plurality of routes, comprising at least one road object corresponding to the at least one calibration object in the list of calibration road objects, wherein each of the selected routes is transmitted by a respective vehicle and comprises:
     - a plurality of successive vehicle locations acquired during a driving session, and
     - the at least one road object detected during the driving session by a sensor of the vehicle, the at least one road object being associated with a location of the vehicle at a time of its detection;
   - for each of the selected routes,
     - computing at least one readjustment parameter representative of a discrepancy between the location associated with the at least one road object in the route, and the actual location associated with the at least one calibration object in the list of calibration road objects,
     - applying the at least one computed readjustment parameter to locations of all road objects included in the route to obtain a calibrated route, and
     - updating the list of calibration road objects with the locations of all road objects included in the calibrated route; and
   - generating a high-resolution map of the road network based on the calibrated routes and the updated list of calibration road objects,
   - the steps of selecting, computing, applying and updating being repeated when the at least one computed readjustment parameter is above a particular threshold.

2. The method as claimed in claim 1, wherein the step of computing the readjustment parameter comprises:
   - computing a first discrepancy between a location associated with a first object in the route, and a location associated with said first object in the list of calibration road objects; and
   - computing at least a second discrepancy between a location associated with a second object in the route, and a location associated with said second object in the list of calibration road objects.

3. The method as claimed in claim 2, wherein the first and second discrepancies are weighted by confidence indices associated with the locations of the first and second objects in the list of calibration road objects, respectively, a confidence index of the confidence indices being inversely proportional to a number of iterations of the steps of selecting, computing, applying and updating that preceded an update of the corresponding object in the list of calibration road objects.

4. The method as claimed in claim 3, wherein the step of computing the readjustment parameter further comprises computing an average of the first and second discrepancies.

5. The method as claimed in claim 2, wherein the step of computing the readjustment parameter further comprises computing an average of the first and second discrepancies.

6. The method as claimed in claim 5, wherein the computed average is an average weighted by confidence indices associated with the locations of the first and second objects in the list of calibration road objects, respectively.

7. The method as claimed in claim 1, wherein, when a route among the selected routes comprises at least first and second road objects corresponding to first and second calibration objects, respectively, in the list of calibration road objects for which first and second readjustment parameters are respectively computed, a third readjustment parameter is estimated for a third road object located temporally in the route between the first and second calibration objects, the estimation being carried out via a regression based on the first and second readjustment parameters computed for the first and second calibration objects and on a respective time of detection of the first, second and third road objects.

8. The method as claimed in claim 7, wherein the regression is weighted by confidence indices associated with the first and second calibration objects.

9. A non-transitory processor-readable data medium storing a computer program comprising instructions for executing the steps of the method of claim 1.

10. A device for locating road objects based on a plurality of routes transmitted by at least one vehicle being driven on a road network, the device comprising a processor and a memory storing computer program instructions that, when executed by the processor, cause the processor to implement steps comprising:

initializing a list of calibration road objects with at least one calibration object associated with an actual location that is known, wherein each calibration object in the list of calibration road objects is associated with a respective actual location that is known;

selecting routes, among the plurality of routes, comprising at least one road object corresponding to the at least one calibration object in the list of calibration road objects, wherein each of the selected routes is transmitted by a respective vehicle and comprises:

a plurality of successive vehicle locations acquired during a driving session, and the at least one road object detected during the driving session by a sensor of the vehicle, the at least one road object being associated with a location of the vehicle at a time of its detection;

for each of the selected routes, computing at least one readjustment parameter representative of a discrepancy between the location associated with the at least one road object in the route, and the actual location associated with the at least one calibration object in the list of calibration road objects, applying the at least one computed readjustment parameter to locations of all road objects included in the route to obtain a calibrated route, and updating the list of calibration road objects with the locations of all road objects included in the calibrated route; and generating a high-resolution map of the road network based on the calibrated routes and the updated list of calibration road objects, the steps of selecting, computing, applying and updating being repeated when the at least one computed readjustment parameter is above a particular threshold.

11. A server comprising the device claimed in claim 10.

* * * * *